Patented July 10, 1928.

1,676,841

UNITED STATES PATENT OFFICE.

PAUL S. SHOAFF, OF AKRON, OHIO, ASSIGNOR TO THE GOODYEAR TIRE & RUBBER COMPANY, OF AKRON, OHIO, A CORPORATION OF OHIO.

GOLF-BALL CENTER.

No Drawing.   Application filed October 8, 1927.   Serial No. 225,026.

My invention relates to the manufacture of golf balls, and it has, for its primary object, the provision of a golf ball center which has a high degree of elasticity and is properly and permanently balanced.

Heretofore the various materials employed in the manufacture of golf ball centers have not proven to be entirely satisfactory, for the reason that they either lack in elasticity, which is requisite to the proper functioning of a ball, or they are composed of matter which deteriorates rapidly and which attacks chemically the rubber tape employed to wind the ball.

I have made the discovery that by compounding a balata resin obtained by deresinating crude balata, with vulcanized or scrap rubber, a golf ball center having not only a high degree of resiliency, which is essential to long flight, but also an unusual degree of permanency is obtained.

A golf ball manufactured according to the provisions of my invention is composed of the resin obtained by concentrating the extract of balata. Such extract, for example, is obtained by treating balata with gasoline. This material is mixed in proportion of 25 parts of concentrated resin with 75 parts of vulcanized rubber, such as rubber threads or strands scrapped from the winding of the balls, or other similar vulcanized rubber material. This mixture is then placed in a vessel and is subjected to the indirect heat of steam maintained at 100# pressure per square inch for a period of approximately 10 hours. At the end of that time, a gel is obtained which may be mixed with sulphur and a loading or weighting agent (usually a lead compound, such as litharge or white lead). The compound is then molded and vulcanized into a center of the desired shape.

While the example described includes a mixture of the balata resin and the rubber scrap in the proportion of 25 parts of resin to 75 parts of scrap rubber my invention is not limited to those proportions because the proportions should be varied in accordance with the degree of resiliency which it is desired to obtain in the finished ball. If the proportion of balata resin is increased, the resiliency of the product will be correspondingly improved. However, an extremely resilient ball may not always be desirable for the reason that it is not well adapted to be used for short shots or putting. The particular proportions for the weighting material and the sulphur are variable quantities for the reason that the proportion of weighting material will vary, not only in accordance with the size of the center which is manufactured, but also with the specific gravity of the ball which it is desired to manufacture. The proportion of sulphur also varies in accordance with the properties of the ball which it is desired to obtain.

A compound prepared according to the following formula insures excellent results when incorporated into a golf ball center 1 1/64 inches in diameter.

|  | Parts. |
|---|---|
| Ground rubber | 11.0 |
| Balata resins | 21.3 |
| Mineral rubber | 3.5 |
| Litharge | 61.5 |
| Sulfur | 2.7 |

A golf ball center manufactured from the materials described, when incorporated in a ball in the usual manner, results in a product capable of unusually long flight, and yet which is quite satisfactory for putting. It also has a very pleasant click and feel when struck by a golf club. These latter properties are very desirable with many players.

Although I have disclosed only the preferred embodiment of my invention and described that embodiment in detail, it will be apparent to those skilled in the art that it is not so limited, but that various minor modifications may be made therein without departing from the spirit of my invention or from the scope of the appended claims.

What I claim is:

1. A composition of matter composed of approximately seventy-five parts balata resin, twenty-five parts scrap vulcanized rubber and a weighting material.

2. A method of manufacturing golf ball centers which comprises compounding balata resin with vulcanized rubber and heating the mixture until it is reduced to a gel-like consistency.

3. A method of manufacturing material for golf ball centers which comprises compounding balata resin with scrap vulcanized rubber, heating the compound until it is reduced to a gel-like consistency, incorporating a weighting material and sulfur into the gel, and vulcanizing the mixture obtained.

4. A method of manufacturing golf ball centers which comprises compounding balata resin with vulcanized rubber, heating the compound for a period of approximately ten hours by means of indirect steam heat, admixing the compound obtained with a weighting material and sulfur, and molding and vulcanizing the mixture.

5. A method of manufacturing golf ball centers which comprises compounding the gel obtained by heating a mixture of balata resin and vulcanized rubber with sulfur and a weighting material and molding and vulcanizing the mixture obtained.

In witness whereof, I have hereunto signed my name at Akron, in the county of Summit, and State of Ohio, this 7th day of October, 1927.

PAUL S. SHOAFF.